(12) United States Patent
Fink (10) Patent No.: US 7,141,982 B2
(45) Date of Patent: Nov. 28, 2006

(54) ESTIMATION OF LEAKAGE RATES USING VOLTAGE MEASUREMENTS

(76) Inventor: James B. Fink, 2302 N. Forbes Blvd., Tucson, AZ (US) 85745

( * ) Notice: Subject to any disclaimer, the term of this patent is extended or adjusted under 35 U.S.C. 154(b) by 77 days.

(21) Appl. No.: 10/454,876

(22) Filed: Jun. 5, 2003

(65) Prior Publication Data

US 2005/0062479 A1   Mar. 24, 2005

(51) Int. Cl.
*G01N 27/02* (2006.01)
*G01R 27/02* (2006.01)

(52) U.S. Cl. ............... 324/444; 324/693; 324/713

(58) Field of Classification Search .......... 324/444, 324/448, 715, 718; 73/49.2
See application file for complete search history.

(56) References Cited

U.S. PATENT DOCUMENTS

| | | | |
|---|---|---|---|
| 4,751,467 A * | 6/1988 | Cooper | 324/557 |
| 4,755,757 A * | 7/1988 | Cooper | 324/557 |
| 4,947,470 A | 8/1990 | Darilek | 324/557 |
| 5,168,748 A * | 12/1992 | Flora, Jr. et al. | 73/49.2 |
| 5,184,083 A * | 2/1993 | Groover | 324/559 |
| 5,357,202 A | 10/1994 | Henderson | 324/557 |
| 5,661,406 A * | 8/1997 | Daily et al. | 324/713 |
| 6,331,778 B1 | 12/2001 | Daily et al. | 324/557 |
| 6,722,207 B1 * | 4/2004 | Feller | 73/861.12 |

* cited by examiner

*Primary Examiner*—Anjan Deb
*Assistant Examiner*—John Teresinski
(74) *Attorney, Agent, or Firm*—Quarles & Brady Streich Lang LLP (57) ABSTRACT

A current is injected in the vicinity of a liquid-containment facility of interest to create a measurable electrical potential field in the ground underlying the site. Voltage is measured at each of a plurality of electrodes and plotted as a function of time. The rate of change of the voltages measured at each electrode was found to be proportional to the flow rate of any leak from the facility. Accordingly, the monitoring system is calibrated with artificially imposed leaks flowing at various rates and the resulting information is used to estimate the flow rate of actual leaks on the basis of the slope of the potential plot recorded by any given electrode over time. In the preferred embodiment of the invention, the flow rates so calculated are averaged to produce an estimate of the rate of leakage.

19 Claims, 9 Drawing Sheets

ESTIMATION OF LEAKAGE RATES USING VOLTAGE MEASUREMENTS

BACKGROUND OF THE INVENTION

1. Field of the Invention

This invention relates in general to the detection and measurement of fluid leaks from containment facilities in the ground. In particular, it pertains to a method for rapidly identifying the occurrence of a leak and for estimating the rate of leakage from the facility.

2. Description of the Related Art

Fluids are stored in tanks or other storage facilities designed to prevent losses and environmental contamination. In particular, liquids are typically contained in enclosed steel and/or concrete facilities or in open structures built over impermeable linings that prevent seepage into the ground. In the case of toxic materials, such as wastes and radioactive substances, it is particularly critical that the containment facility remain leak-proof for a very long time. Accordingly, regulatory requirements have increased over the years to ensure that toxic materials are not released into the environment.

In spite of good storage practices and regulatory mandates, seepage of toxic liquids into the ground is a serious environmental problem and much work has been done to detect underground leaks from storage facilities as promptly as possible after they occur. The early detection of toxic leaks from tanks is particularly important to avoid contamination of aquifers and water streams. This extensive research in the field has produced several successful procedures for locating underground leaks using resistivity-measurement techniques.

For example, U.S. Pat. No. 4,947,470, issued to Darilek (1990), describes a method for detecting and locating leaks in geomembrane liners used to contain liquids by measuring the electric or magnetic field created by a current flowing through a leak. An array of detectors is placed in known locations on one side of the liners and a voltage is impressed across the liner. When a leak occurs, a current flows through the leak and corresponding electric and magnetic fields are created around the leak. Thus, the presence of a leak is sensed by the detector array, and the location of the leak is established geometrically using orthogonal measurements from selected detectors.

In U.S. Pat. No. 5,357,202 (1994), Henderson teaches a method for monitoring a site and locating the presence of leaks from containment vessels by measuring subsurface changes in the conductivity of the soil. Conductivity information is derived from the electrical potential field established in the soil when a predetermined current is imposed between two electrodes. Voltage measurements taken periodically are mapped across the subsoil and converted to corresponding conductivity information. By comparing present conductivity values with a data base known to correspond to normal operating conditions, the presence and location of leaks are detected from changes in the conductivity map of the subsoil.

In U.S. Pat. No. 6,331,778 (2001), Daily et al. teach a similar technique for detecting and locating fluid leaks in liners of containment facilities and in reservoirs, tanks, and the like. Using the well-known mise-a-la-masse (excitation of the mass) technique and tomographic imaging, electrical resistivity data are derived on the basis of voltage measurements between an electrode placed in the fluid and a plurality of electrodes placed in the ground around the periphery of the facility. The leak position is located by determining the coordinates of an electrical current source pole that best fits the measured potentials with the constraints of the known resistivity distribution.

All of these prior-art techniques utilize electrical measurements carried out with electrodes judiciously placed in the soil underlying and surrounding the site of interest. A current is imposed between two electrodes and voltage or magnetic field measurements are taken between various pairs of other electrodes in order to acquire information capable of reflecting changes indicative of a leak of fluid into the soil. As such, these techniques have proven to be useful and reliable in order to detect and locate leaks, but they have not provided information related to the flow rate of a leak. Accordingly, there is still a need for a detection procedure capable of detecting as well as measuring the rate of flow of a leak from a tank or other containment facility.

In particular with reference to radioactive wastes stored in concrete or lined steel tanks, the conventional approach to leak detection has been to sink vertical casings around the perimeter of the tank placed several meters apart from one another. Detection probes are lowered to various depths into each casing to monitor the soil in the vicinity of the casing. If a leak occurs and liquid radioactive material flows within a radius of about one meter from any of the probes, the leak is detected and its location can be estimated on the basis of the position of the casing through which the leak was sensed. While useful when leaks from a tank flow near the probes, this technique is seriously deficient in all other cases and disastrous environmental effects may occur and remain undetected. This invention is directed at providing a detection technique that provides immediate information about the presence of a leak and, at the same time, an estimate of the flow rate of the leak.

BRIEF SUMMARY OF THE INVENTION

In view of the foregoing, the present invention is intended for use in conjunction with prior-art techniques that locate leaks from storage facilities in the ground, so that a complete detection, location and flow-rate measurement solution is provided. Metal casings and other metal structures already present in the ground are preferably utilized as electrodes for carrying out the procedure of the invention. The same type of apparatus described in the prior art for mise-a-la-masse and similar techniques is used for the present invention.

Thus, a predetermined electrical current is imposed between two injection electrodes grounded in the vicinity of a liquid-containment facility of interest, thereby creating a measurable electrical potential field in the ground underlying the site. An array of sensing electrodes is used to measure the potential at each electrode's location and monitor changes in the potential field that result from environmental variations. As well understood in the prior art, any leak from the containment facility that permeates through the ground will affect the resistivity of the soil and change the potential-field pattern created by the current injected into the ground. Based on these changes, the leak is detected and measured.

The voltage measured at each of the plurality of electrodes in the sensing array is continuously monitored and plotted as a function of time. According to one aspect of the invention, it was discovered that any leak of a substantially constant flow rate produces a correspondingly constant change in the voltage measured at each electrode site. The voltage may increase or decrease depending on the effect the leak produces on the local resistivity of the soil, but a change is registered at all locations where the leak affects the potential field. Preferably, voltage probes are located all around the containment facility and the current is injected within the area defined by them, so that voltage changes are recorded by all electrodes regardless of the exact location of the leak. As a result, any leak can be immediately detected by the array of sensing electrodes.

According to another aspect of the invention, it was discovered that the rate of change of the potential measured at each electrode is proportional to the flow rate of the leak. Accordingly, the monitoring system is calibrated with artificially imposed leaks flowing at various rates and the resulting information is used to estimate the flow rate of a leak on the basis of the slope of the potential plot recorded by any given electrode over time. In the preferred embodiment of the invention, the flow rates obtained by each electrode as a result of calibration are averaged to produce an estimate of the rate of leakage. This simple approach was found to produce surprisingly accurate results regardless of the actual location of the leak in the containment facility.

Various other purposes and advantages of the invention will become clear from its description in the specification that follows and from the novel features particularly pointed out in the appended claims. Therefore, for the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DESCRIPTION OF THE PREFERRED EMBODIMENTS OF THE INVENTION

The heart of this invention lies in the discovery that voltage measurements recorded with a grid of electrodes embedded in the ground around a tank or other liquid-containment facility can be used advantageously not only for the immediate detection of a leak, but also to estimate the flow rate of the leak. Because the principles and methodology of data collection required to practice this invention are the same as previously disclosed with reference to techniques utilized to detect and locate leaks, they are not described in detail here. The present invention consists of new procedures and corresponding new means for processing voltage data recorded over time, but it is understood that such data may be collected using conventional procedures and apparatus. For simplicity, the invention is described with reference to a storage tank, but it is intended to apply to any storage facility capable of releasing seepage into the ground.

As used herein, the term "transmitting" refers to electrodes used to inject a known current into the ground to establish a baseline potential field in the soil underlying and surrounding a storage tank. The term "receiving" refers to electrodes used to measure the voltage of electrodes located within the potential field in order to monitor variations produced by changes in the environment. According to conventional practice, two transmitting electrodes are used to produce a current flow in the soil between them.

Figure 1:
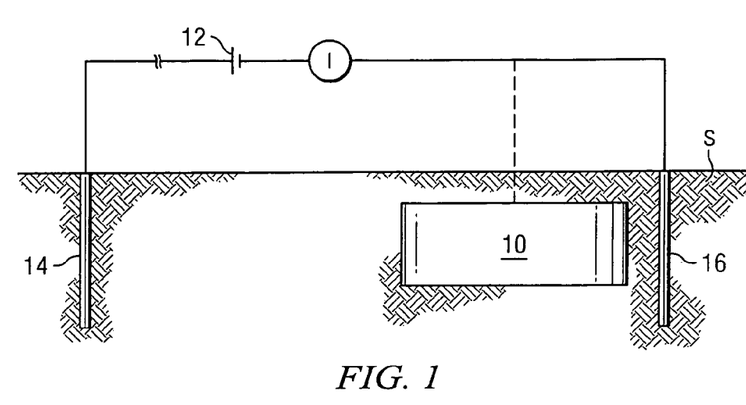
FIG. 1 is a schematic illustration of an underground toxic-waste storage site with a pair of transmitting electrodes installed in the ground to establish a predetermined electrical current flow and a corresponding potential field through the soil.

Referring to the drawings, wherein the same numerals and symbols are used throughout to designate like parts, FIG. 1 illustrates such an arrangement with reference to an entered storage tank 10 at a typical nuclear-waste management facility. A power source 12 is connected to two transmitting electrodes 14,16, grounded into the soil S at the site of the tank 10 in order to establish a predetermined flow of electrical current I through the ground that separates the electrode pair. The electrodes are judiciously placed so as to establish a measurable potential field in the soil under and around the tank 10. Accordingly, the first transmitting electrode 14 is located at some remote distance from the tank 10, while the second transmitting electrode 16 is placed in the vicinity of the tank. Preferably, the electrode 14 is located far away from the tank, virtually at infinity. If the tank 10 incorporates a conductive structure in contact with the ground, the tank itself may be used as the second transmitting electrode 16 (as indicated by the broken line in FIG. 1). Similarly, any conductive structure embedded in the soil S can be used as a receiving electrode for the purposes of the invention.

As one skilled in the art would readily understand, geophysical electrical calculations are based on the assumption that each receiving electrode is a point electrode; that is, an electrode so small compared to inter-electrode distances that it can be treated as a point source. Thus, it is understood that appropriate adjustments must be made to account for the spatial distribution of voltage along the electrode volume when sizable electrodes are used, such as long rods, existing well casings, or other interred conductive structures.

Figure 2:
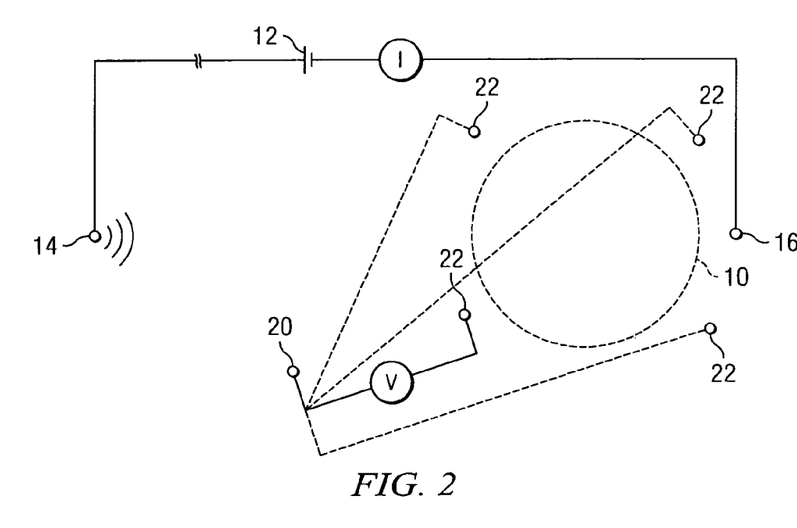
FIG. 2 is a schematic representation, in plan view, of the site of FIG. 1 with a grid of receiving electrodes installed in the ground to measure the potential at various locations around the storage tank.

As illustrated schematically in the plan view of FIG. 2, a grid of receiving electrodes 20,22 (not shown in FIG. 1) is installed in the surface of the soil or underground around the tank 10 in order to measure the spatial distribution of the potential field established by the passage of the current I between the two transmitting electrodes 14,16. While a voltage measurement can be carried out between any pair of electrodes, a preferred approach is to use a single receiving electrode 20 as a reference and to measure the potential difference between each other receiving electrode 22 and electrode 20, as illustrated in FIG. 2. Under such an arrangement, the reference electrode 20 is also preferably placed at some remote distance from the other receiving electrodes.

It is noted that while only two transmitting electrodes 14 and 16 are required to practice the invention, any number of receiving electrodes may be used in a pattern preferably selected to provide optimal coverage of the potential field created by the current I, which of course depends on the geometry and material composition of the soil and structures on the site. The method of the invention could be implemented with a single pair of receiving electrodes, but its accuracy will improve with the number of voltage data used to map the potential field and, therefore, also with the number of electrodes distributed over the area covered by the system. On the other hand, experiments showed that an array of three or four well-placed receiving electrodes 22 is sufficient to monitor and accurately estimate the flow rate of leaks from a tank, and that the accuracy of the estimates is not materially increased by the additional information provided by significantly greater numbers of receiving electrodes. Such additional electrodes are helpful and may be required when a particularly non-uniform geologic structure or facility configuration is present.

Figure 3:
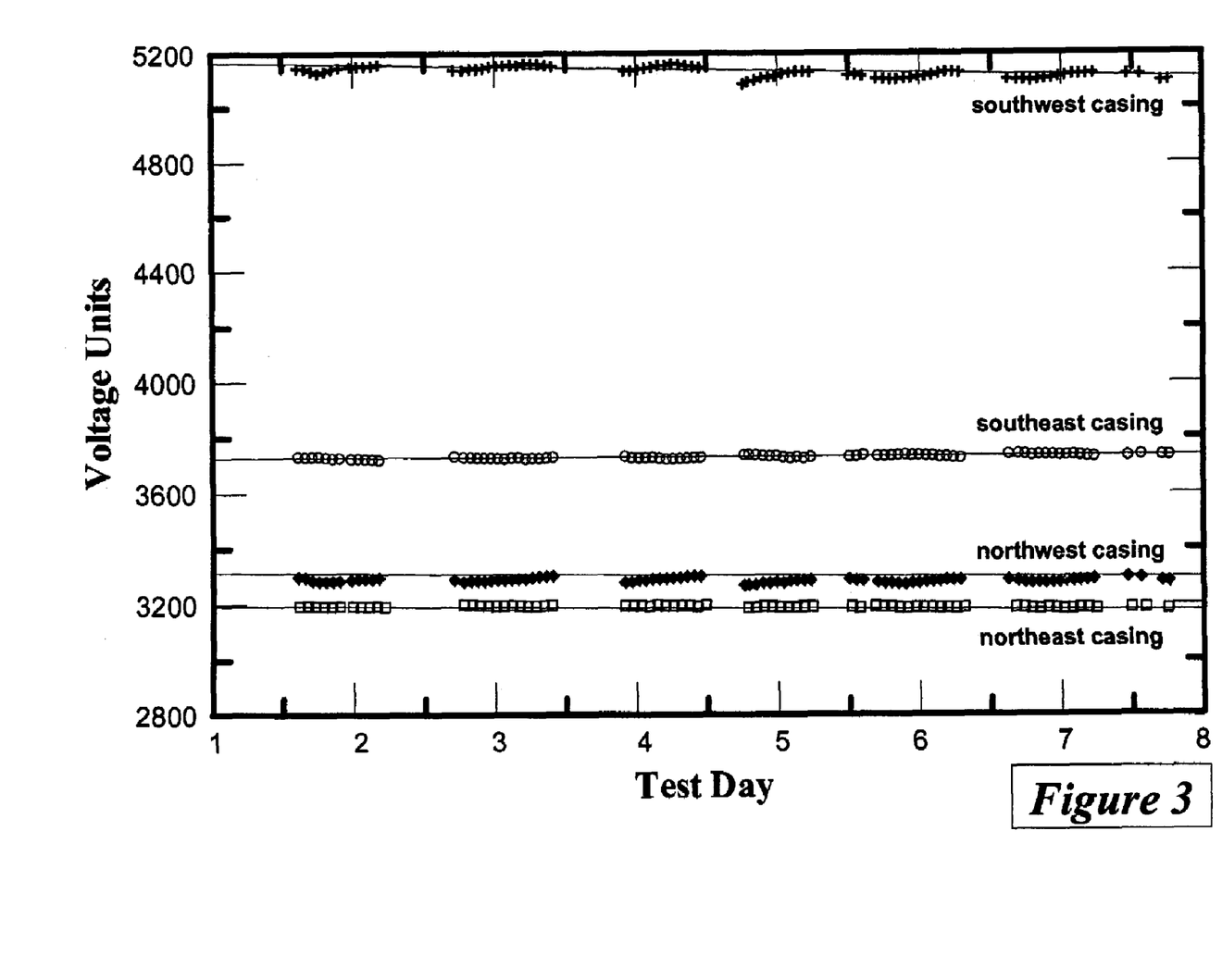
FIG. 3 is a voltage-versus-time plot of data collected at four receiving electrodes placed around a storage tank in the absence of a leak.

According to the invention, a constant current I of sufficient amplitude to establish a discernible potential field is injected into the ground in conventional manner through the transmitting electrode pair 14,16. The receiving electrodes 22 are then used to measure and record voltage (i.e., the potential difference with respect to the reference electrode 20) as a function of time at corresponding locations, thereby providing voltage-versus-time data of the type illustrated in the plot of FIG. 3. As is well understood in the art, the potential field created by the current I is affected by environmental changes in the soil traversed by the current, such as moisture variations or the introduction of other materials that alter the bulk resistivity of the soil. Otherwise, the potential field and correspondingly the voltage measurements acquired from the various receiving electrodes tend to remain substantially constant, as shown in the figure, and the minor perturbations reflected in the data do not affect the overall constant trend of the measurements obtained from each electrode.

Figure 4:
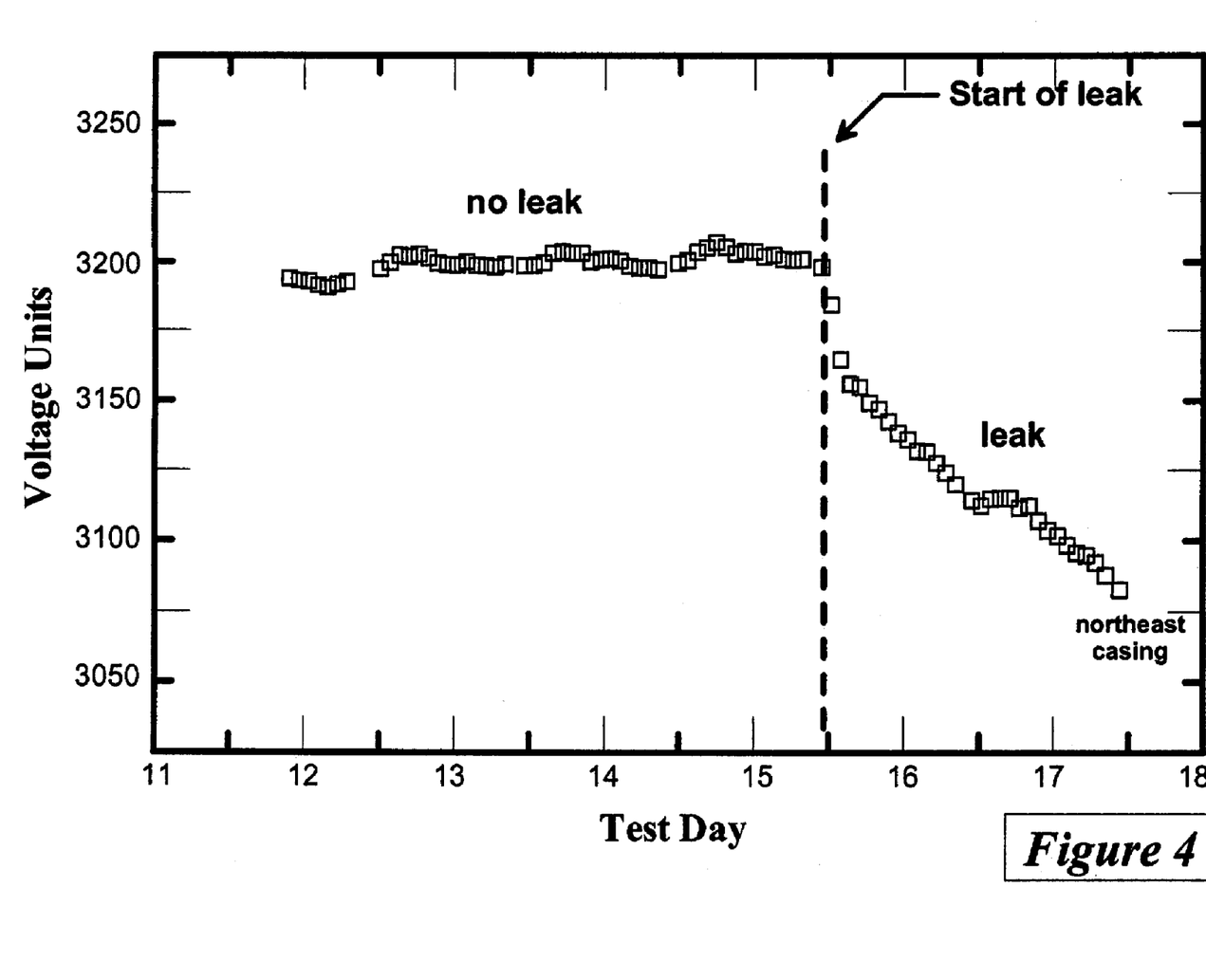
FIG. 4 is an exemplary voltage-versus-time plot of data collected at the site of a receiving electrode showing the response to a leak simulated by injecting a liquid into the ground from the storage tank.

Field tests at a site set up in the configuration of FIGS. 1 and 2 showed that the presence of a leak from the tank 10 produces an immediate and material change in the voltage measurements recorded at each receiving electrode site. Greater changes are generally recorded by electrodes closer to the location of the leak. As illustrated in FIG. 4 for a typical receiving electrode 22, the voltage rapidly changes from its initial average baseline value upon the start of a liquid injection simulating a leak (indicated by the line 30 in the figure), as expected. Surprisingly, though, if the rate of injection is kept constant, the rate of change of the voltage was also found to remain constant. According to the invention, this property is advantageously exploited to estimate the flow rate of a leak by monitoring the potential field in the ground.

Figure 5:
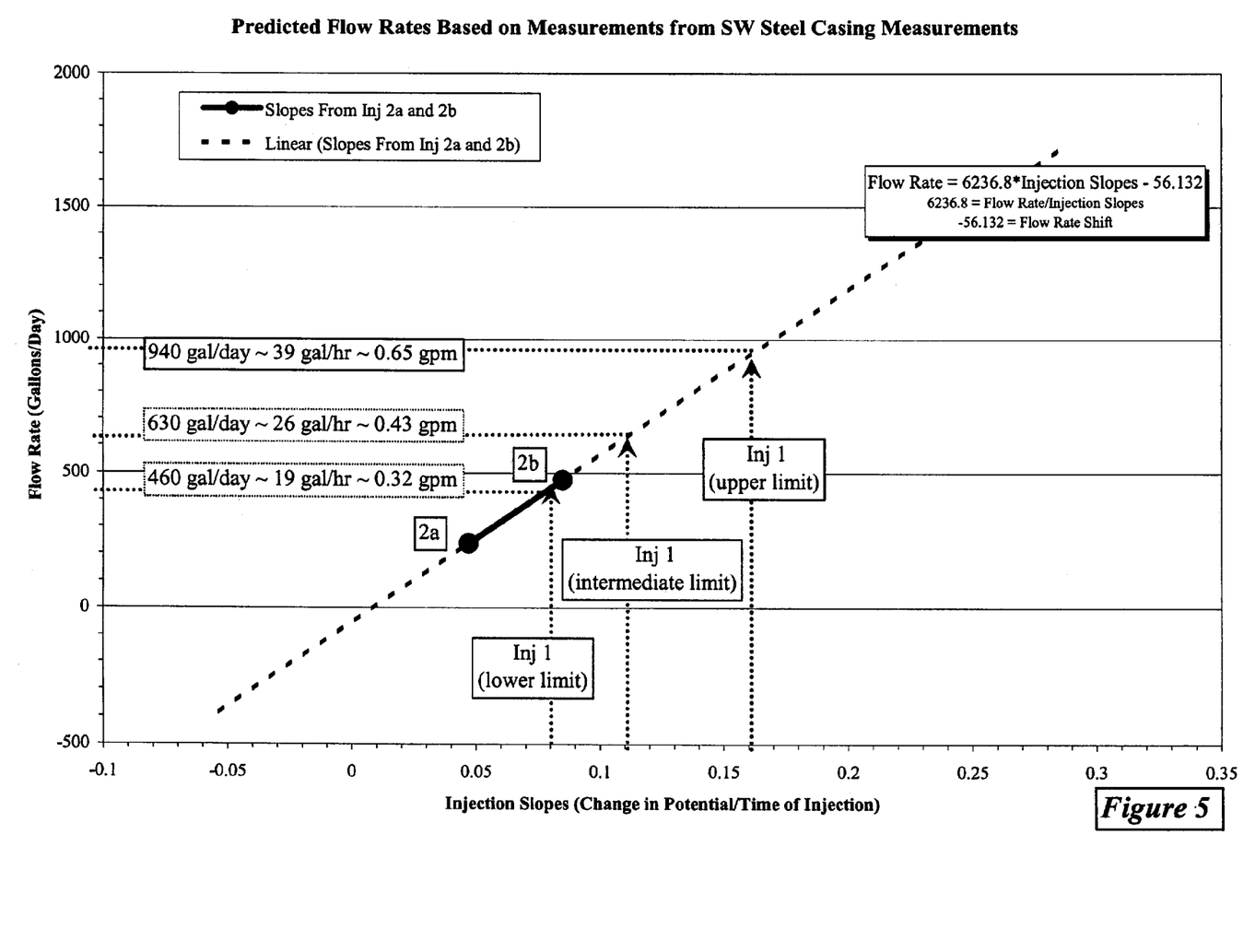
FIG. 5 is a plot that illustrates the linear relationship between leakage flow rates and the slopes of corresponding voltage-versus-time plots.

Further site tests conducted with various constant levels of injection of the same liquid (to simulate different rates of leakage) revealed an additional surprising property of the potential field imposed on the site by a constant current I flowing between the transmitting electrodes 12, 14. As illustrated in FIG. 5, the slope of the voltage-versus-time plots for each electrode was found to be proportional to the rate of liquid injection. This discovery implies at least an empirical linear correlation between the leakage flow rates and the slopes of the voltage/time plots recorded at the site of the receiving electrode. The same type of relationship was observed in the data collected with all electrodes. This linear relationship may be expressed in general by the equation $$R = K_1 \times S + K_2 \tag{1}$$

where R is leakage flow rate, S is the slope of the voltage-versus-time plot recorded at a given electrode location, and $K_1$ and $K_2$ are empirical constants related to the overall geometry of the system (including the relative location of the leak and the electrode), bulk resistivity, and environmental conditions (such as temperature).

According to the invention, this empirical relationship is used to provide a model to predict leakage rates at the site of interest. The equation is fitted for each electrode at the site by simulating various flow rates of leakage (including no leakage) from the tank 10 and acquiring corresponding voltage data from each receiving electrode 22. Voltage-versus-time plots are generated, as illustrated in FIG. 4, and the slopes corresponding to various flow rates are used to construct a rate-versus-slope plot for each receiving electrode, as illustrated in FIG. 5, from which the linear relationship of Equation 1 may be derived. Since this fitting procedure is carried out to model actual leaks, the liquid used should obviously be of a type having electrical and physical characteristic similar to the liquid contained in the tank 10. Repeating this calibration procedure for each receiving electrode 22 at the site, an empirical model is provided from which actual leaks may be detected and measured.

As one skilled in the art would expect, the modeling accuracy of Equation 1 as applied to each receiving electrode 22 at a site is affected by the location of the actual leak from the tank 10 as compared to the position of the simulated leaks that were used to fit the equation. Therefore, the leakage flow rate predicted using information from each receiving electrode would be expected to vary in unpredictable fashion, greatly diminishing the usefulness of Equation 1. According to yet another surprising discovery, though, repeated tests showed that this problem can be overcome simply by using an average of some or all flow rates calculated using the information obtained from each receiving electrode. That is, a relationship in the form of Equation 1 is developed empirically by calibration with simulated leaks for each receiving electrode on the site; each relationship is used to estimate a flow rate when an actual leak occurs; and the various values so calculated are arithmetically averaged to obtain an estimate of the actual leak.

Figure 6:
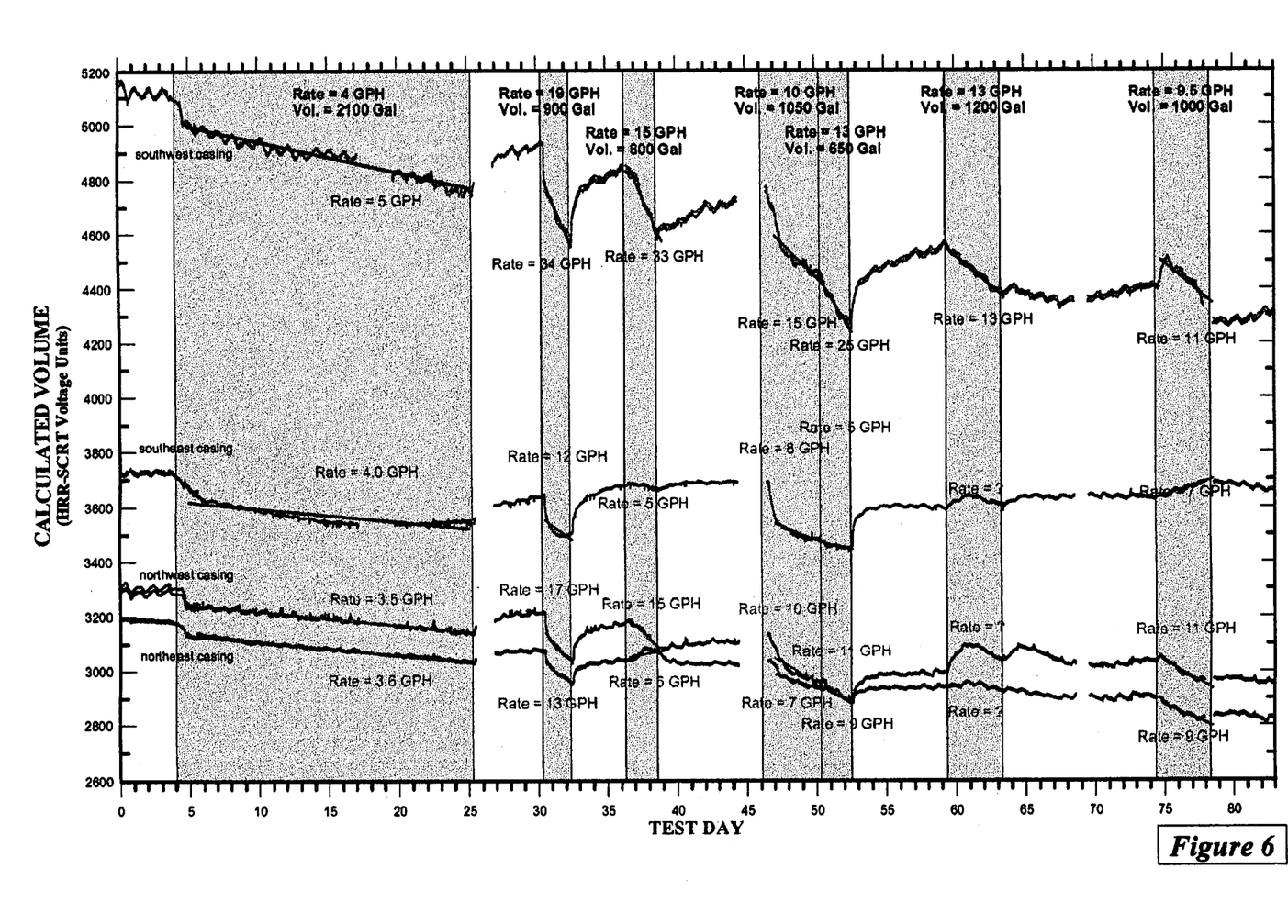
FIG. 6 is a graph of normalized voltage measurements recorded during the time of seven leak simulations by four receiving electrodes in the configuration of FIG. 2 at a test site, wherein the substantially constant slopes resulting from the simulated leaks are illustrated for each electrode.

Thus, once a system with a particular electrode configuration at a site has been calibrated as described above, continuous monitoring of the potential field produced by a constant current applied to the transmitting electrode pair enables the immediate detection of a leak and the calculation of an accurate estimate of the leak's flow rate. FIG. 6 illustrates the results produced with four receiving electrodes consisting of existing casings sunk into the ground at four coordinate corners (NE, SE, SW and NW) around a cylindrical tank site. A current of about 500 milliamps at about 100 volts (0.1–1.0 amps were used during various tests) was injected through the tank (that is, using the tank as a transmitting electrode, which is the preferred practice) and each receiving electrode was calibrated with simulated leaks of 940, 630, and 460 gallons per day to derive a linear relationship of the type expressed in Equation 1. All calibration leaks were produced by selecting a liquid with electrical and physical properties similar to the liquid stored in the tank at the site and by injecting the liquid from the same location within the tank (different locations were used for different tests, producing different calibration equations). The system was then tested by simulating actual leaks at different times from various locations in the tank.

Figure 7:
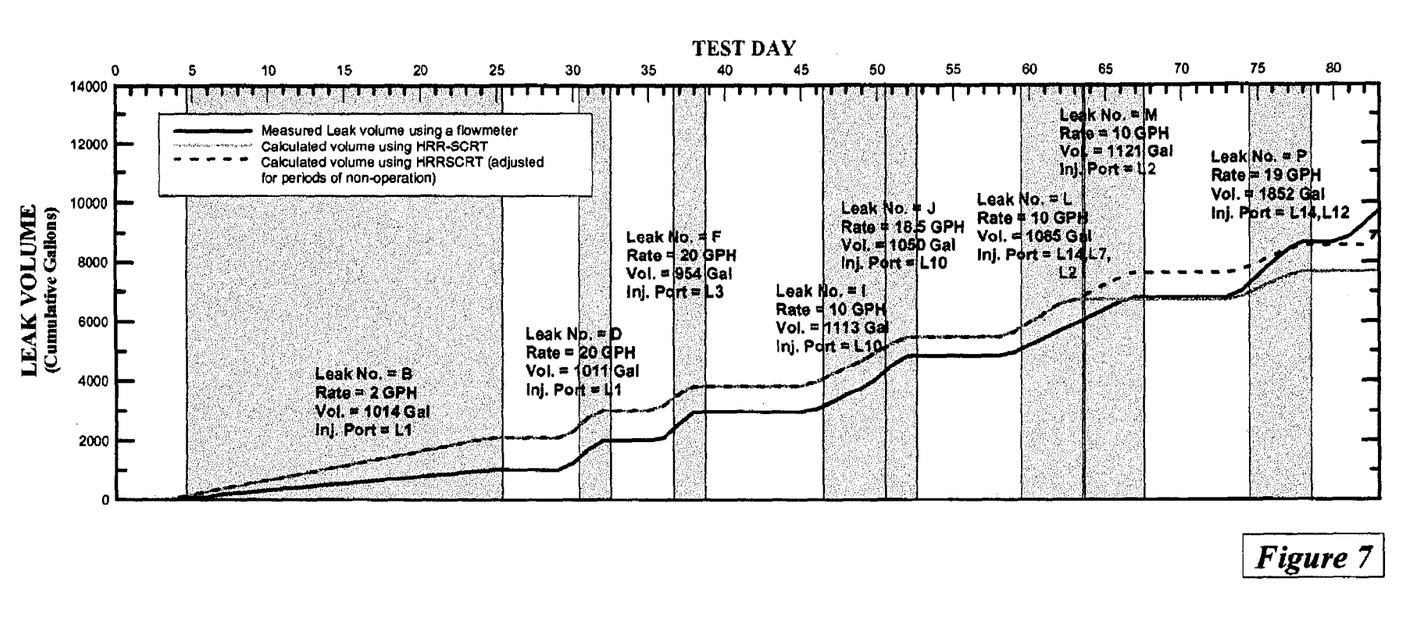
FIG. 7 is a graph of the cumulative actual and calculated leaks corresponding to the voltage data of FIG. 7.

As clearly seen in FIG. 6, the voltage recorded at each receiving electrode was substantially constant prior to the existence of a leak. The voltage is reported in normalized units in order to account for unavoidable fluctuations in the injected current. Immediately upon the occurrence of a leak, the voltage measured by each electrode varied significantly, thereby providing a valuable tool to detect the leak, and quickly settled into a trend with a substantially constant slope. Based on the value of this slope and the linear relationship provided by Equation 1, a flow rate was calculated for each receiving electrode and an average rate was used as the estimate of the actual rate of leakage. As shown in FIG. 7, the estimated cumulative flow rate during the course of time required to carry out seven separate simulations over about three months tracked closely the cumulative value of the actual leaks, thus demonstrating the efficacy of the procedure of the invention even in the absence of any knowledge about the precise location of the source of the leak.

Figure 8:
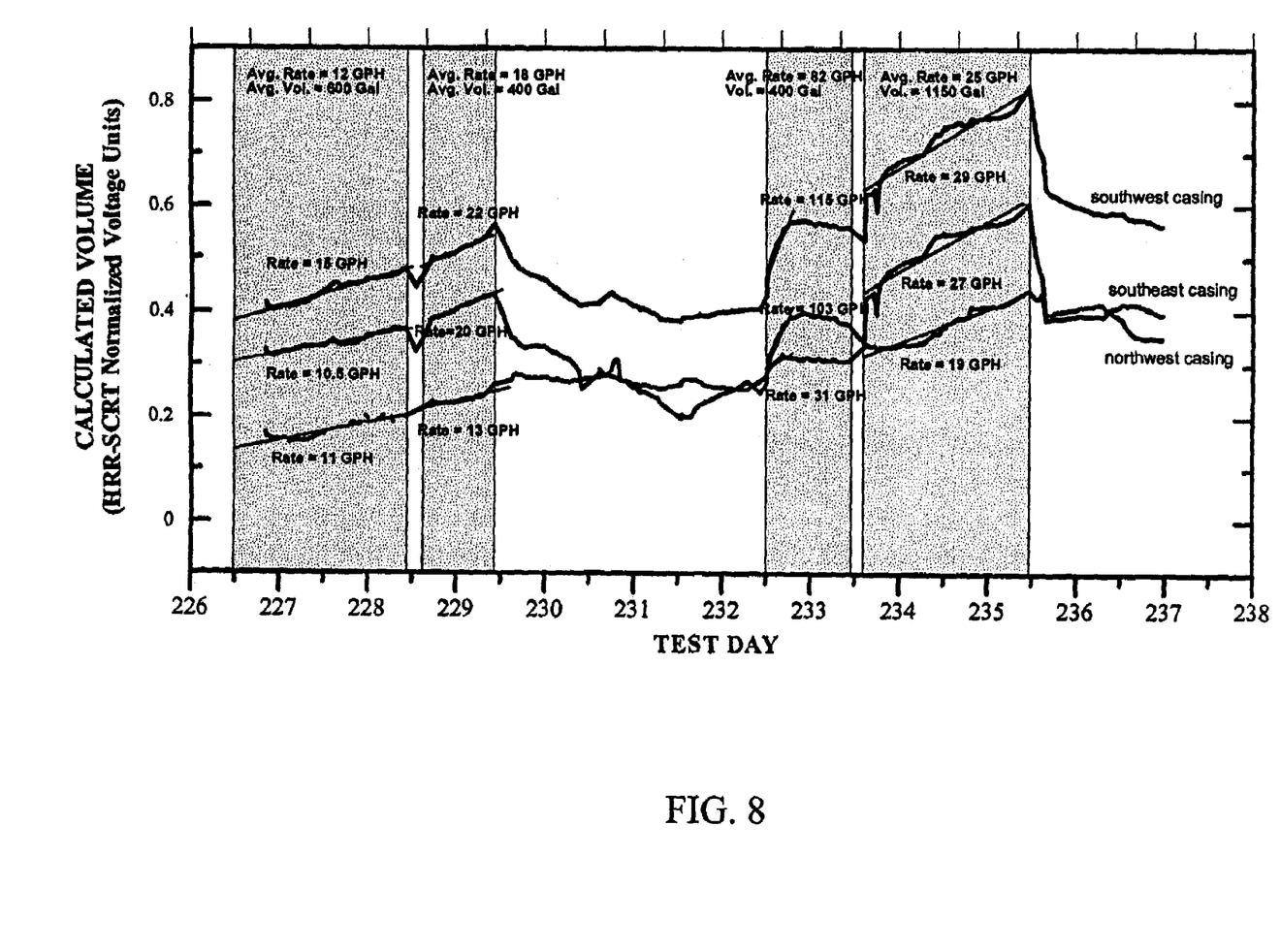
FIG. 8 is another example of a graph of normalized voltage measurements recorded during leakage simulations by four receiving electrodes in the configuration of FIG. 2 at the same test site.
Figure 9:
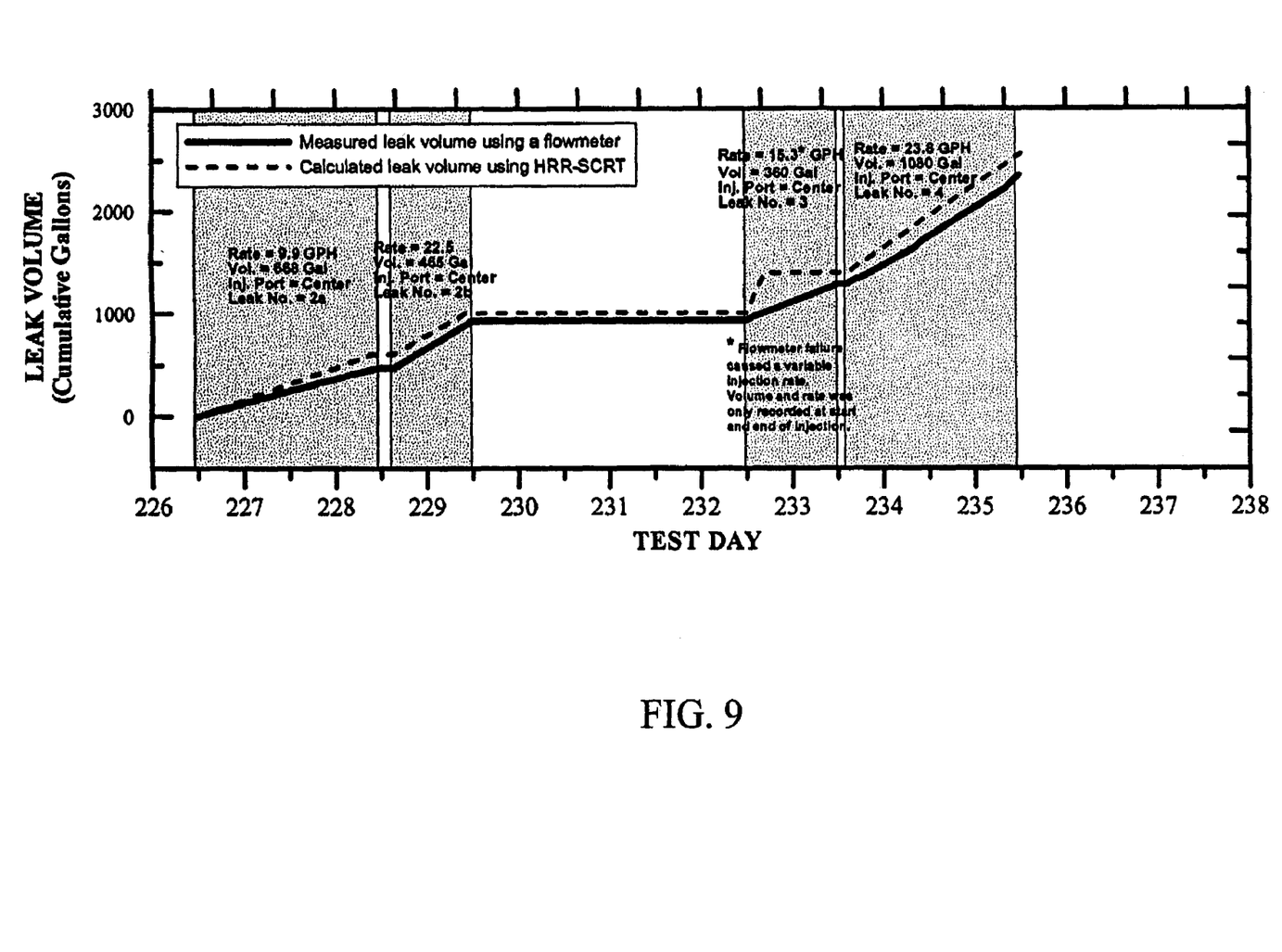
FIG. 9 is a graph of the cumulative actual and calculated leaks corresponding to the voltage data of FIG. 8.
Figure 10:
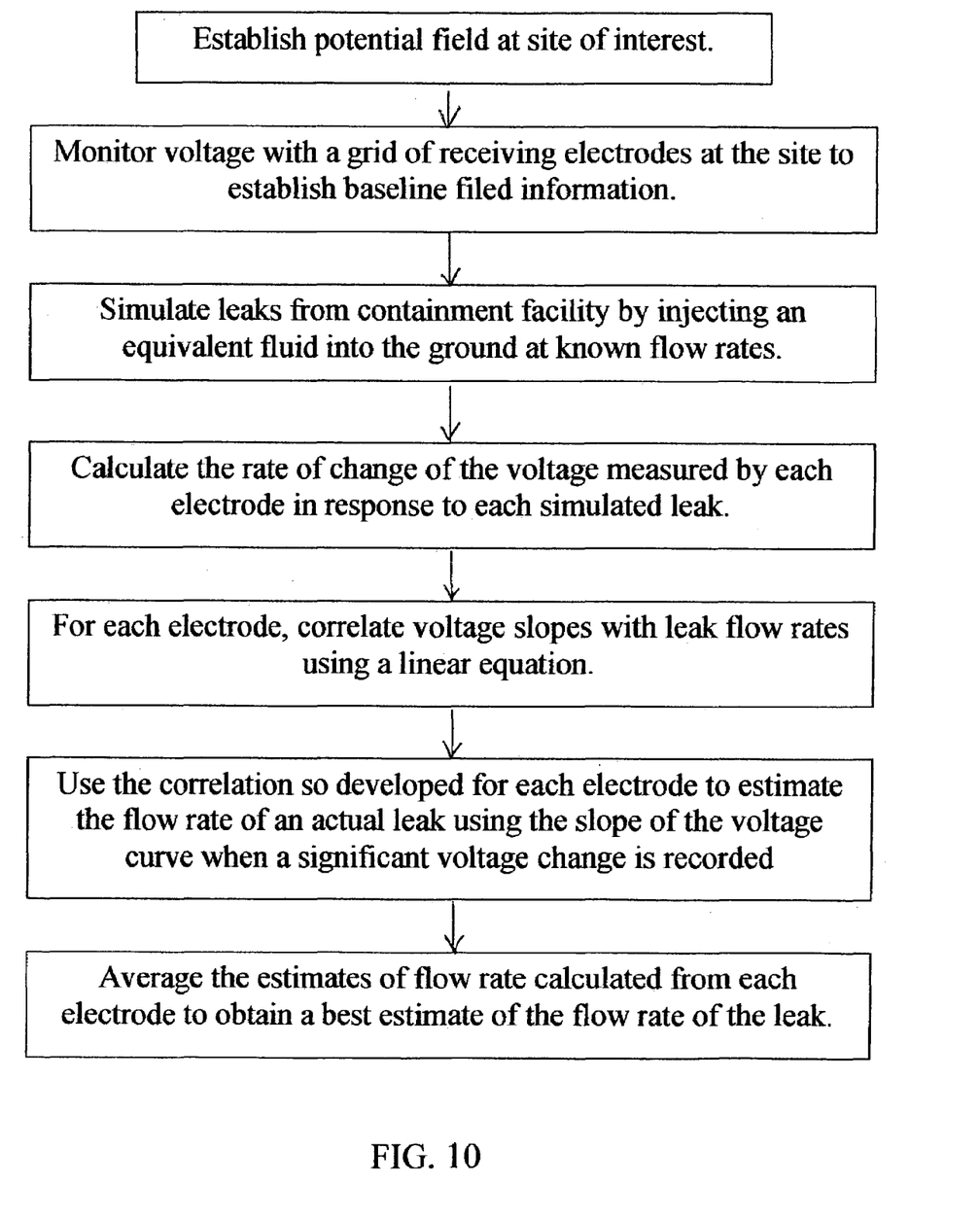
FIG. 10 is a flow chart of the steps of the invention as applied to a given leak-monitoring site.

FIGS. 8 and 9 report the results obtained from another test carried out using the calibration and testing technique described above. These results show that leaks at a tank site can be immediately detected by monitoring the potential field established by a current injected at the site (preferably using the containment facility as either the injecting or the receiving electrode); that the rate of change of the potential measured by any given receiving electrode can be used to derive an empirical relation between the rate of change and leakage flow rate; and that the flow rates calculated using such empirical relations for each receiving electrode can be advantageously averaged to reliably estimate the actual leakage rate. Thus, a novel procedure has been described that successfully complements prior-art techniques of leak detection and location based on voltage measurement. The basic steps of the method of the invention are shown in FIG. 10.

It is important to note that the heart of the invention lies in the discovery that the slope of the voltage variation measured by a given electrode remains substantially constant when a leak occurs, and that a predictable correlation exist between this slope and the flow rate of the leak. The additional discovery that the correlation is substantially linear is very useful in practice, but it is not equally significant in theory because a different type of equation could be used to model and fit through calibration the actual correlation for each electrode according to empirical data. Such different equations could then be used to estimate leaks in equivalent fashion. Thus, the scope of the invention should not be limited to the use of linear correlations.

Those skilled in the art will also readily recognize that the invention can be practiced with an electrode system already in place to detect and locate leaks using ground voltage measurements. Thus, the availability of pre-existing casings and other conductive structures at the sites of interest can be advantageously utilized. For example, during the development of the invention, electrical measurements were made using various types of structures as electrodes, such as conventional stainless-steel electrodes, carbon-steel tanks, carbon-steel structures, casings located on site, and existing electrical resistance tomography (ERT) vertical arrays.

Various changes in the details, steps and components that have been described may be made by those skilled in the art within the principles and scope of the invention herein illustrated and defined in the appended claims. For example, the flow rates calculated using the information from each electrode may be averaged in a weighted manner, rather than arithmetically. The particular weights used could be derived using standard best-fit procedures. Also, the invention has been described in terms of a separate pair of transmitting electrodes and a grid of receiving electrodes distributed around the site of the tank. In practice, it is understood that many other arrangements can be used to collect the voltage data required to detect and quantify leaks. For example, measurements may be carried out between steel casings and a steel tank by energizing the casings and measuring potentials at the steel tank; between steel casings and an injection electrode by energizing each steel casing and measuring the potential at the injection electrode; between surface electrodes and the steel tank by energizing the steel tank and measuring potentials at the surface electrodes; between surface electrodes and the injection electrode by energizing the injection electrode and measuring potentials at the surface electrodes; between surface electrodes and steel casings by energizing each steel casing and measuring potentials at the surface electrodes; between ERT "pseudo-casings" by energizing one pseudo-casing and measuring the resultant potentials at all other pseudo-casings; between the steel tank and the ERT "pseudo-casings"; and, finally, between a central-injection electrode and the ERT "pseudo-casings." Reciprocal measurements may also be made.

Similarly, the invention has been described with reference to an underground tank, but it could be practiced in equivalent manner with any surface containment facility for the detection and measurement of underlying underground leaks. Thus, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

I claim:

1. A method for estimating the flow rate of a leak from a containment facility at a site, the method comprising the following steps:
   injecting an electrical wound current in order to establish a potential field in the ground at the site externally of the containment facility;
   monitoring said potential field over time by measuring ground voltage at the site externally of the containment facility; and
   calculating an estimate of the flow rate of a leak from the containment facility by correlating said flow rate with rate of change of ground voltage measured at the site externally of the containment facility.

2. The method of claim 1, wherein said injecting step is carried out using the containment facility as an injection electrode.

3. The method of claim 1, wherein said injecting step is carried out using an injection electrode located outside the site.

4. The method of claim 1, wherein said monitoring step is carried out using a reference electrode located outside the site.

5. The method of claim 1, wherein said monitoring step is performed with a plurality of electrodes located in the ground within the site externally of the containment facility, said calculating step including correlating said flow rate with rate of change of ground voltage measured at each of said plurality of electrodes.

6. Apparatus for estimating the flow rate of a leak from a containment facility at a site, comprising:
   means for injecting an electrical ground current in order to establish a potential field in the ground at the site externally of the containment facility;
   means for monitoring said potential field over time by measuring ground voltage at the site externally of the containment facility; and
   means for calculating an estimate of the flow rate of a leak from the containment facility by correlating said flow rate with rate of change of ground voltage measured at the site externally of the containment facility.

7. The apparatus of claim 6, wherein said monitoring means includes a plurality of electrodes located in the ground within the site externally of the containment facility, said calculating means being designed to correlate said flow rate with rate of change of ground voltage measured at each of said plurality of electrodes.

8. The method of claim 7, wherein said calculating step includes using a linear equation to correlate said flow rate with rate of change of ground voltage measured at each of said plurality of electrodes.

9. The method of claim 8, wherein said calculating step includes obtaining said estimate of the flow rate from each of the plurality of electrodes and calculating an average thereof.

10. The method of claim 7, wherein said calculating step includes obtaining said estimate of the flow rate from each of the plurality of electrodes and calculating an average thereof.

11. The apparatus of claim 7, wherein said calculating means includes a linear correlation between said flow rate and rate of change of ground voltage measured at each of said plurality of electrodes.

12. The apparatus of claim 11, wherein said calculating means includes means for obtaining said estimate of the flow rate from each of the plurality of electrodes and for calculating an average thereof.

13. The apparatus of claim 7, wherein said calculating means includes means for obtaining said estimate of the flow rate from each of the plurality of electrodes and for calculating an average thereof.

14. The apparatus of claim 6, wherein the containment facility constitutes an injection electrode for said injecting means.

15. The apparatus of claim 6, wherein said injecting means includes an injection electrode located outside the site.

16. The apparatus of claim 6, wherein said monitoring means includes a reference electrode located outside the site.

17. A method for developing a correlation between the flow rate of a leak from a containment facility at a site and a variable related to a potential field established in the ground at the site externally of the containment facility, the method comprising the following steps:
   (a) monitoring said potential field over time by measuring ground voltage at the site externally of the containment facility;
   (b) simulating a sequence of leaks from the containment facility at different flow rates;
   (c) calculating rate of change of ground voltage measured at the site externally of the containment facility in response to each of said different flow rates; and
   (d) developing a correlation between said flow rates and the rates of change of ground voltage calculated in step (c);
   whereby said correlation may be used to estimate leakage flow rates as a function of observed rates of changes in ground voltage measured at the site externally of the containment facility.

18. The method of claim 17, wherein said correlation is based on a linear relation.

19. The method of claim 17, wherein said monitoring step is performed with a plurality of electrodes located in the ground within the site externally of the containment facility, said calculating step including calculation of rate of change of ground voltage measured at each of said plurality of electrodes in response to each of said different flow rates.

* * * * *